(12) United States Patent
Lobb et al.

(10) Patent No.: US 6,459,941 B1
(45) Date of Patent: Oct. 1, 2002

(54) METHOD FOR HANDLING ESTIMATION/ RATIOING OF ADJUSTMENT

(76) Inventors: Jolan Fredda Lobb, 2172 Donner St. NW, North Canton, OH (US) 44720; Richard Joseph Olsen, 3945 State St. NE, Canton, OH (US) 44721; Ray Allison Young, 6210 Briggle Ave., SW, East Sparta, OH (US) 44626; Robert Carlton Whittum, 4151 Shaw Rd., Akron, OH (US) 44333; David Henry Manka, 408 Helena Dr., Tallmadge, OH (US) 44278

( * ) Notice: Subject to any disclaimer, the term of this patent is extended or adjusted under 35 U.S.C. 154(b) by 124 days.

(21) Appl. No.: 09/757,857

(22) Filed: Jan. 10, 2001

Related U.S. Application Data

(63) Continuation of application No. PCT/US99/10625, filed on May 13, 1999.

(51) Int. Cl.⁷ .............................................. G06F 17/00
(52) U.S. Cl. .......................... 700/90; 700/29; 700/30; 700/31; 700/89; 700/91; 700/110; 707/100; 707/101; 707/182
(58) Field of Search .......................... 700/108–110, 28, 700/29, 30, 31, 89, 90, 91; 709/100, 101, 102

(56) References Cited

U.S. PATENT DOCUMENTS

| | | | | | |
|---|---|---|---|---|---|
| 5,339,818 | A | * | 8/1994 | Baker et al. | 128/925 |
| 5,448,684 | A | * | 9/1995 | Holt | 382/156 |
| 5,461,644 | A | * | 10/1995 | Bergmans et al. | 375/341 |
| 6,018,311 | A | * | 1/2000 | David | 342/101 |
| 6,300,778 | B1 | * | 10/2001 | Frederickson et al. | 324/693 |

\* cited by examiner

*Primary Examiner*—Ramesh Patel
(74) *Attorney, Agent, or Firm*—David E. Wheeler

(57) ABSTRACT

A method allows estimation of selected parameters of a given population based on non-homogenous sampling of the population data. In the method, an algorithm is applied to data in a 'least parts' approach, to facilitate the assumption that sampling of data is 'piece-wise' homogenous, when it is known that overall, the data sampling is not homogeneous.

2 Claims, 3 Drawing Sheets

METHOD FOR HANDLING ESTIMATION/ RATIOING OF ADJUSTMENT

This application is a continuation of pending international application number PCT US 99/10625, filed May 13, 1999.

TECHNICAL FIELD

This invention relates to a method for estimating performance parameters, such as dollar loss by condition, and units defective by condition, for different periods of business and/or production. For these estimations, population totals are known (or assumed known). An estimation algorithm allows detailed analysis as is required for problem-solving and similar uses of parametric data.

BACKGROUND ART

When a total population value is known (or can be assumed known), traditional estimation procedures apply a general percentage to all data points and all parameters. For example, if the known data represents 5 percent of the population, the parameter values of the sample data are multiplied by 20 (100%/0.5%) as an estimation. This estimation technique works if the data are randomly sampled and there is little or no bias to the sample.

There is frequently skewing and bias in the sampling procedure, however, and gross estimating procedures break down when one tries to analyze parameters at a detail level. By "detail level" is meant the estimation of a specific parameter or condition for a total population.

In the conception of the invention, the inventors theorized that a part-wise approach to sampling that is applied non-homogenetically could overcome the prior art deficiencies. Biases may result from bringing into the sampling, over time, data that cause more sampling representation of specific members of a population type or geographical area than other members bring. Whatever the source of the bias in the sampled data versus the total population, the bias needs to be minimized if any detail level analyses of the data are to be useful.

This invention looks to minimize biases by making estimations at varying levels of the analyses, where the assumption is reasonable that sampling is piece-wise homogenous at the various levels. At a minimum, the estimation is made using every data point provided in a given report, for that report.

Other objects of the invention will be apparent from the following description and claims.

SUMMARY OF THE INVENTION

A method for estimating conditions for a population of unknown conditions comprises the steps of (a) accumulating data for a specific population including population members having known parameters and population members having unknown parameters, wherein said specific population is defined for a specific time period, and a specific product, (b) retaining data for said specific population for a period of time, (c) breaking down the population members having known parameters into specific categories of conditions for all specific time periods reported, (d) applying the condition rate for said population members having known parameters to the specific population for a specific time period.

The method may comprise the further step of summing the estimation for said specific time periods to obtain an estimation for all conditions for all time periods.

DETAILED DESCRIPTION OF THE INVENTION

Figure 1:
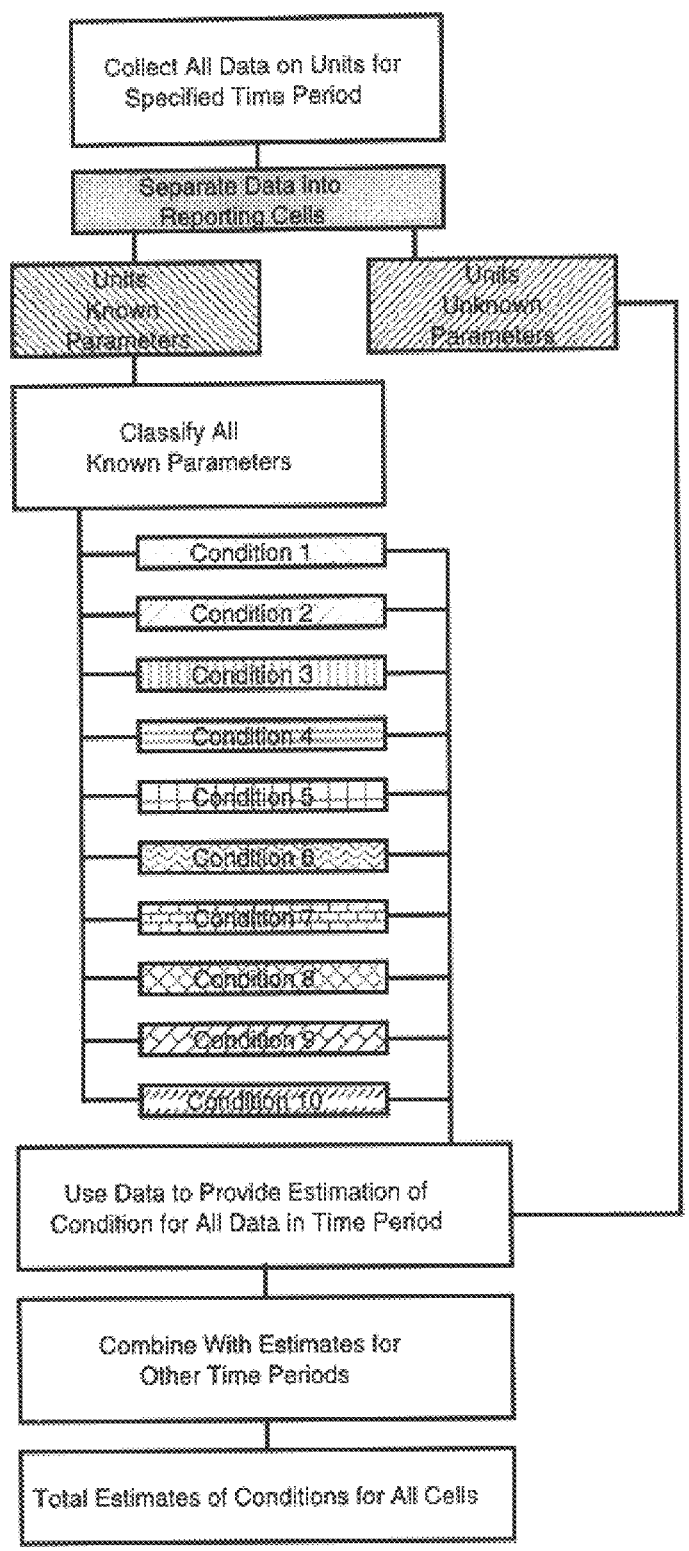
FIG. 1 illustrates a block diagram showing the steps of the method or algorithm of the invention.

With reference now to FIGS. 1 and 2, an improved algorithm is used for estimating parametric measures of a population from non-homogeneous sampled data. The algorithm allows for detailed analysis of estimated parameters of a total population when valid measures are reported for only a sample of the total population.

In the illustrated embodiment, the values for total cost (loss) and total defective units are known for the population of a specific product. A debit record is made for each charged unit at a general level. Certain units are then sent on to an inspection location where a specific failure condition is determined and recorded. Therefore, a limited number of the defective items have specific conditions reported, and the vast majority of the items are recorded only generally as "defective". The algorithm may be applied to an entire class of a product or to a specific subset of the class (such as a specific line or brand or model). The performance parameters may be estimated using data collected over a number of years. The parameters may be tracked over time and the changes over time used to modify the database to allow for estimation.

For each data point, there are key values known. Three of the following four values are known or can be determined for any 'reporting cell'. These values include: (1) the total cost and units (or similar metric) for a given block of time such as a calendar quarter of time, (2) the number and cost (or similar metric) of the items that have a specific detailed condition noted, (3) the number and cost (or similar metric) of items that have no detailed conditions noted and (4) the number and cost (or similar metric) of items that were assigned any of the detailed conditions as an estimation. "Cell" or "reporting cell" refers to any specific piece of data or parameter that is collected and reported in a data chart. For example, and for purposes of illustration, if sidewall failure in the shoulder of a tire is reported, data on such failures is reported in one 'cell'. The data can be an interim value or a final value.

If a cell is combined with other cells, full accuracy of the data would be maintained in the original cell (i.e. an estimated value would be maintained in its cell to a significant decimal, such as 3.657, even though such data would be reported in a final report, where it lo may be combined with other cells, as a whole number, e.g. 4 whole tires, instead of part of a tire).

In the illustrated embodiment, these values are collected for each time period of interest, whether monthly, quarterly, semi-annually or annually, and data for this selected time period is collected and tracked, on a continuing basis, for a period of years if possible. For example, if data is available for a number of years, January data only for this succession of years is grouped and analyzed, and the trends or conditions determined (preferably in terms of percentages for each condition) are applied only to the current January data, to estimate conditions for the current January.

The data may be weighted for the current January because of environment conditions specific for the current January. For example, if the time period examined experiences record temperatures, and the data appears to be different from the average data for previous years by ⅓, such environmental conditions may skew the data. The weighting for each time period may be calculated as a function of the known skewness of the data measured for the different time periods. To obtain a more accurate estimate of data for the current time period, the historical data may be given a weight of ⅓ for estimating the current data, and the data from the current time period may be given a weight of ⅔. Those skilled in the art will be able to make weighting determinations based on the conditions observed, and the kind of data being considered.

Using the known values for the reporting time period, and applying the knowns to the population incidence, cost or a similar measure is estimated for that time period only. Different estimations are made for the total data and for each subset of the total data reported. Estimations on total data are the accumulated values of the known parameter plus the estimated portion of the unknown for each of the reporting time periods.

The invention is applicable using one time period. The use of known conditions for one time period directly, a relatively small sample, gives some basis for an estimation of a larger sample. In such a small sample, however, it is possible to inspect a hundred tires, for example, out of a total population of a thousand, and find no tread separations, whereas prior data may show that in past years tread separations represented 5% of the population. This may be an indication that the data is not truly representative of the total population. Accordingly, it is preferred if possible, to include data from similar time periods from prior years in the estimation. This can be done by adding knowns from each similar prior time period available, and determining the percentage of each condition from all the time periods in the total knowns for all the time periods.

With reference specifically to FIGS. 2a through 2d, the algorithm parses the total data into reporting cells according to time periods and condition subsets as required. It then calculates the value of the following: the known condition or parameter, the total amount of 'known' conditions/parameters, the total of all data in the cell. The estimated value reported in that cell is then the known specific value times the total value divided by the total of all specific 'knowns'. This calculation is performed for each cell reported.

With reference again to FIG. 1, using product failures and adjustments to illustrate the method of the invention, as a first step, all data is collected for a specified time period regarding the number of failures, without regard to the reason for the failure.

As a second step, data on the product failures is broken down into products for which the reason for failure is known, and products for which the reason for failure is not known. The information regarding the total products for which no information is known about the specific reason for failure is not used, except for calculating their percentage of the total, and for determining statistical variation probabilities, such as standard deviation.

As a third step, the data relating to the portion of the products for which a failure mode is known is further broken down into specific failure categories or conditions. For example, if the product is a tire, condition 1 might represent the number of tires showing sidewall failure in the shoulder of the tire, condition 2 might represent a bead failure, and condition 3 might represent a puncture in the tread, and so on. Each condition represents a specific percentage of the products for which a failure mode is known, and the total percentage of the conditions known for this product segment is 100%, for the time period of interest.

As a fourth step, the percentage of conditions known for the product segment having known conditions is then applied to the total population as an estimate. Results of such estimations are illustrated in FIGS. 2a through 2d.

As a fifth step, the results for a given time period may be combined with results calculated for other time periods, to give an estimation for a greater time period. Monthly calculations, for example, can be used to derive an annual estimate in the manner illustrated in FIG. 3.

With reference now to FIGS. 2a to 2d, using the representative conditions for the segment of products for which a condition is known for a specific time period, the percentages calculated for each condition are applied to the total number of products failed for that time period, to obtain an estimate for specific causes for all product failures in the time period.

Figure 2A:
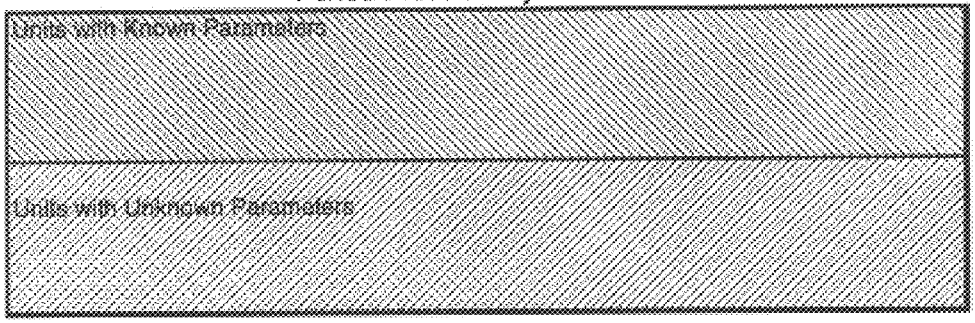
FIG. 2a through 2d illustrate block diagrams showing the percentage of known conditions as it applies to an estimate of conditions for units with unknown parameters.

FIG. 2a represents total product adjustments for a given period, broken down into products where the reason for the adjustment is known, and products for which the reason for adjustment is not known.

Figure 2B:
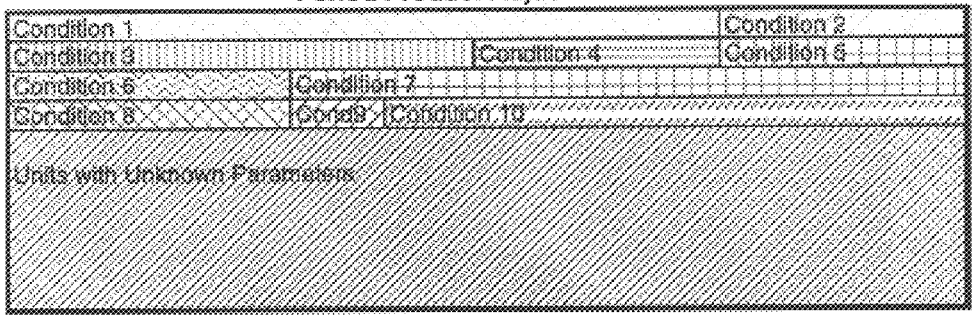

FIG. 2b illustrates a more detailed breakdown of specific conditions for failure of products for which conditions are known, together with a representation of products for which the reasons for adjustments are not known.

Figure 2C:
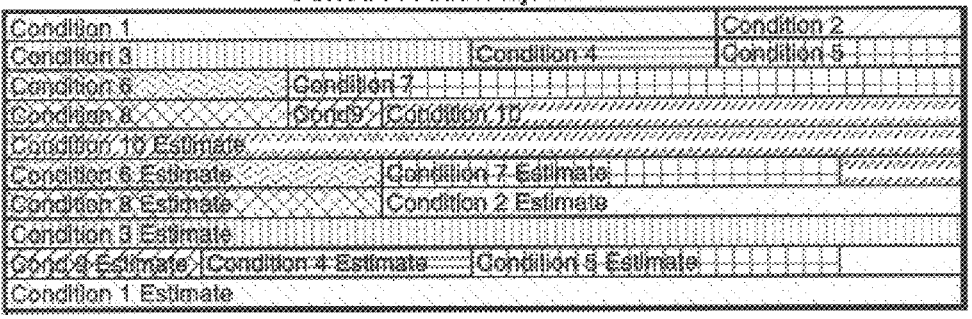

FIG. 2c illustrates the total population of products where conditions of failure are known, and conditions are estimated for products where conditions are not known based on the percentage breakdown for products with known conditions, to give a breakdown of conditions for a total population for a specific time period. The total for any condition in the total population is the condition known plus the condition estimated.

Figure 2D:
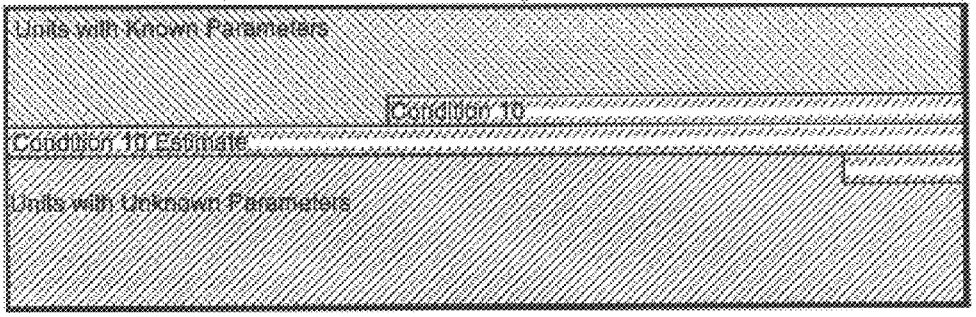

FIG. 2d illustrates specifically how the estimation of a specific condition for units with unknown parameters is made and combined with conditions known for a specific condition for a specific time period.

Figure 3:
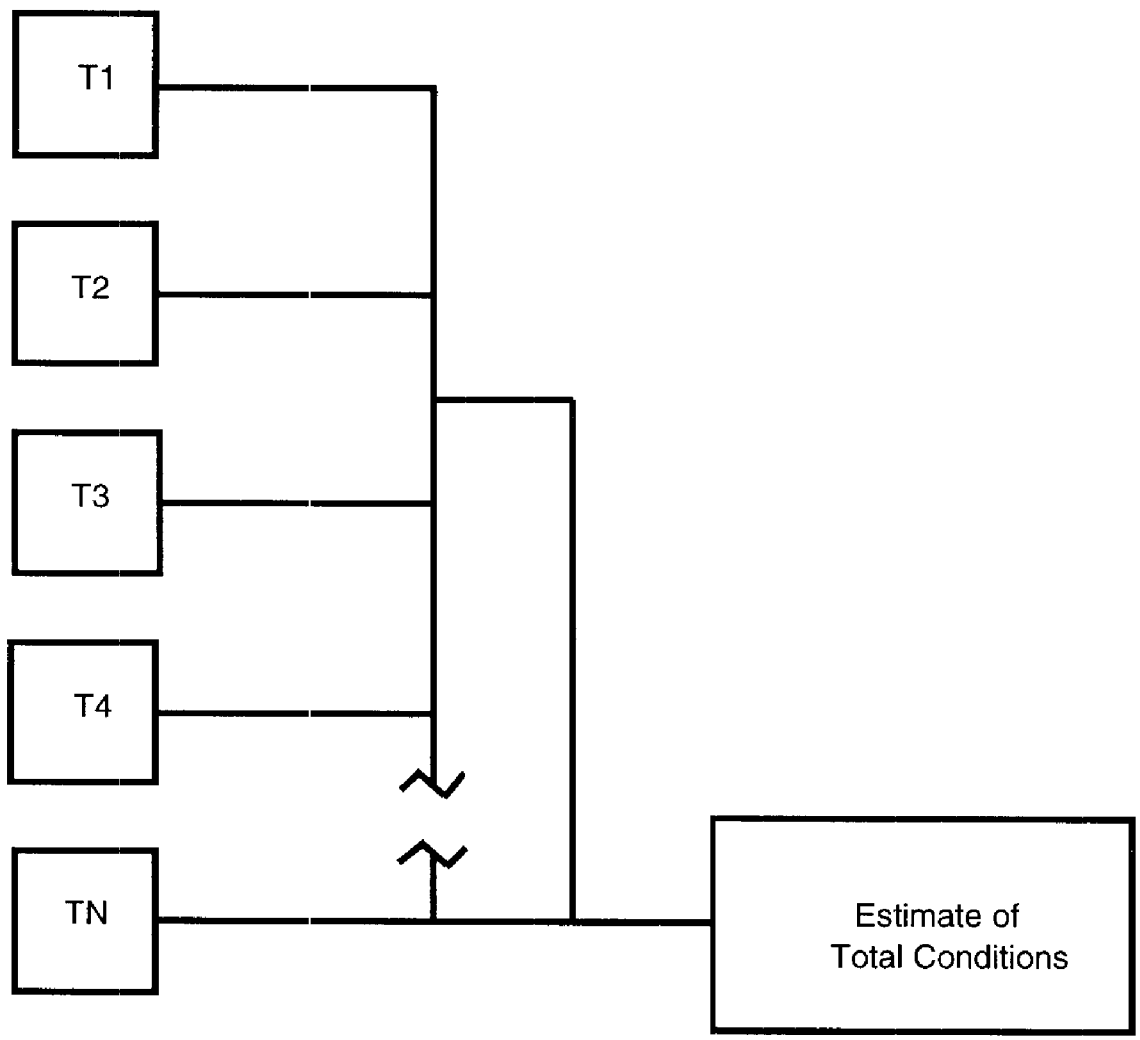
FIG. 3 illustrates a second block diagram showing the summing of detailed estimates for specific time periods to provide estimates for the entire population.

With reference to FIG. 3, the cause of failure may be seasonaly dependent, e.g., for farm tires there may be more stubble damage in the fall and more sidewall tears in the spring, and there may be three times as many failures in the spring than in the winter. In order to obtain an estimate for the specific causes of all failures in a year, estimates of the failures from the total from each time period are made separately, and the calculated totals from each time period are added together to get estimates of the totals for the year.

Any number of time periods may be used in the method, and accordingly, in FIG. 3, T1 to T4 are illustrative (e.g. four quarters in a year), and TN represents the Nth time period selected, wherein N would represent twelve if monthly time periods for a year is chosen, for example, or N could equal thirty if each day in a month is chosen.

To minimize the biases mentioned above, it is important that if totals are estimated for a large time period, that separate calculations be made for each smaller time period separately, and the totals from the separate smaller time periods be added, instead of finding an average of the time periods making up the wider time period reported.

Those skilled in the art will recognize that the conditions illustrated, and the time periods represented in the drawings are representative of one possible use of the invention, and that the method can be used with a variety of data sets and conditions, depending on the kind of estimations which are to be made.

In the preferred embodiment, these calculations are accomplished in a structured query language and the estimation is performed in an array mode.

An example of coding for the method of the invention is illustrated below using "Proc-Sq1" application software from SAS Institute, Inc., Cary, N.C.

```
PROC SQL;
    CREATE TABLE known AS
        SELECT GROUP, COND, SUM(COST) AS
            kCOST, SUM(UNITS) AS kUNITS
        FROM subsetdata
        WHERE (parameters are known and time period
            right)
        GROUP BY GROUP, COND
        ORDER BY GROUP, COND;
    * get all;
    PROC SQL;
CREATE TABLE all AS
    SELECT GROUP, COND, SUM(COST) AS
        kCOST, SUM(UNITS) AS kUNITS
    FROM subsetdata (go back to first pass subset since
        previous extract only took known records)
    WHERE (time period)
    GROUP BY GROUP
    ORDER BY GROUP, COND;
* get all known and add this variable to each record;
PROC SQL;
CREATE TABLE specific AS
    SELECT *, SUM(kCOST) AS cCOST, SUM
        (kUNITS) AS cUNITS
    FROM subsetdata (do it from this compressed
        dataset rather than at the main extracting for
        performance)
    GROUP BY GROUP
    ORDER BY GROUP, COND;
* now combine them . . . getting the alls from mastera
    and the rest from the cid file masterc;
PROC SQL;
CREATE TABLE MASTER AS SELECT a.group,
    a.cond, a.cCOST, b.acost, a.kcost,
    a.cunits, b.aunits, a.kunits
    FROM known a, all b
    where a.GRUP=b.grup and a.cond=b.cond
    ORDER BY a.GRUP, a.cond;
* now the estimating based on specific code/all known
    codes=spec code/all adj - - - >spec code=all adj *
    specific code/all known codes;
PROC SQL;
CREATE TABLE master AS
    SELECT GROUP, COND, kCOST * acost/ccost AS
        COST, kUNITS * aunits/cunits AS UNITS
    FROM master
    ORDER BY GROUP, COND;
```

In some embodiments of the invention, further statistical measures and statistical tests, such as t-tests and Chi Square analysis, may be applied to the estimated or ratioed values calculated for the invention.

The invention is further illustrated with reference to the following example.

EXAMPLE

This example illustrates how the basic concepts of the invention can be applied to estimate the causes of tire adjustments for a population of tires when the reason for adjustment is known only for a limited number of tires.

In this example, the estimating and calculating is done using software available from SAS. The software is a statistically based programming application known as 'proc sq1', which is used extensively to create tables of data, each application having collections of the metrics needed to do the estimating or ratioing on large volumes of data. Other programming languages may be used to accomplish the same calculations and estimates, following the concepts and procedures taught in this application.

The first set of statements selects the appropriate 'window' of data from the larger database to prepare to measure the skewness of the distributions and collect the needed parameters for the estimations.

```
PROC SQL;
    CREATE TABLE known AS
        SELECT GROUP, COND, SUM(COST) AS
            kCOST, SUMMITS) AS kUNITS
        FROM subsetdata
        WHERE (parameters are known and time period
            right) GROUP BY GROUP, COND
        ORDER BY GROUP, COND;
```

Then, the data are measured to collect those parameters that are considered known, namely the 'all subsets' measures:

```
* get all
    PROC SQL;
        CREATE TABLE all AS
            SELECT GROUP, COND, SUM(COST) AS
                aCOST, SUM(UNITS) AS aUNITS
            FROM subsetdata (go back to first pass subset
                since previous extract only took known
                records)
            WHERE (time period)
            GROUP BY GROUP
            ORDER BY GROUP, COND;
```

Then measure the parameters for the incidences that are considered 'known'—i.e., the measured values:

```
* get all known and add this variable to each record;
    PROC SQL;
        CREATE TABLE specific AS
        SELECT *, SUM(kCOST) AS cCOST, SUM
            (kUNITS) AS cUNITS
        FROM subsetdata (do it from this compressed
            dataset rather than at the main extracting for
            performance)
        GROUP BY GROUP
        ORDER BY GROUP, COND;
```

Then combine these values on each record of the data: * now combine them . . . getting the ails from mastera and the rest from the cid file masterc;

```
PROC SQL;
    CREATE TABLE MASTER AS SELECT a.group,
        a.cond, a.cCOST, b.acost, a.kcost,
        a.cunits, b.aunits, a.kunits
        FROM known a, all b
        where a.GRUP=b.grup and a.cond=b.cond
        ORDER BY a.GRUP, a.cond;
```

Now the data have the following in each record: the known, the totals(which are also known). Then the skewness of the distribution can be measured for each value to be reported based in the summing and combining done to calculate each value. The invention then teaches to apply that skewness measure to the estimating procedure for each collected or calculated value:

* now the estimating based on specific code/all known codes=spec code/all adj - - - >spec code=all adj * specific code/all known codes;
PROC SQL;
   CREATE TABLE master AS
      SELECT GROUP, COND, kCOST * acost/ccost AS COST, kUNITS * aunits/cunits AS UNITS
     FROM master
     ORDER BY GROUP, COND;

These values can then be applied and reported to any reporting cell in the final reports. By virtue of the table method of calculating, the measures of skewness and appropriate weighting factors are stored and applied to each cell individually. The tables used in the invention must be constructed to maintain this level of detail to each individual reported value, not just the final and collected values usually reported as 'totals'.

FOR EACH CELL OF A REPORT:

$$\frac{CID\ CODE}{ALL\ CID} = \frac{ALL\ CODE}{ALL\ ADJ}$$

where CID CODE=the units/cost of a specific code (ex C01) with a CID assigned code
   ALL CID=the units/cost of all valid CID assigned codes
   ALL CODE=the estimated value for a specific code (ex C01)
   ALL ADJ=the units/cost of ALL adjustments/concessions
EACH CELL Means different things for each report:—FOR EACH CODE ANALYZED:
   Triangle/Trend—for each REPORTED DATE ADJUSTED & DATE PRODUCED (Quarterly, Monthly, Yearly)
   Leading Condition/DOLLAR—for each REPORTED DATE ADJUSTED (Quarterly, Monthly, Yearly)
MATRIX—for each REPORTED LINE and DATE ADJUSTED (Quarterly, Monthly, Yearly)
ESTIMATED PARAMETERS—UNITS or DOLLARS
   use ALL CODE=INT((CID CODE/ALLCODE) * ALL ADJ) for either estimated units or estimated dollars
RATIOED PPM
   use RPPM=(((CID CODE/ALLCODE) * ALL ADJ)/PRODUCTION) without rounding—except to format results for output.
GENERAL: RATIOs reported are to be actual calculated ratios(CID CODE/ALLCODE) rounded to 1 or 2 decimal points. Averaging across any cells is NOT VALID since the CID CODE/ALLCODE ratio is not uniformly distributed across any parameter.

What is claimed is:

1. A method for estimating conditions for a population of unknown conditions comprising the steps of (a) accumulating data for a specific population including population members having known parameters and population members having unknown parameters, wherein said specific population is defined for a specific time period, and a specific product, (b) retaining data for said specific population for a period of time, (c) breaking down the population members having known parameters into specific categories of conditions for all specific time periods reported, (d) applying the condition rate for said population members having known parameters to the specific population for a specific time period.

2. The method of claim 1 comprising the further step of (e) summing the estimation for said specific time periods to obtain an estimation for all conditions for all time periods.

* * * * *